United States Patent [19]

Miura et al.

[11] Patent Number: 4,989,041
[45] Date of Patent: Jan. 29, 1991

[54] OPTICAL SCANNING DEVICE FOR IMAGE FORMING APPARATUS

[75] Inventors: Tatsuyuki Miura, Yokohama; Kazuhiro Ikemori, Kawasaki, both of Japan

[73] Assignee: Kabushiki Kaisha Toshiba, Kawasaki, Japan

[21] Appl. No.: 304,208

[22] Filed: Jan. 31, 1989

[30] Foreign Application Priority Data

Feb. 18, 1988 [JP] Japan .................................. 63-33916

[51] Int. Cl.⁵ .............................................. G03G 15/00
[52] U.S. Cl. ...................................... 355/235; 355/236
[58] Field of Search ................ 355/233, 235, 236, 243

[56] References Cited

U.S. PATENT DOCUMENTS 4,629,310 12/1986 Landa et al. ......................... 355/243
4,763,171 8/1988 Schell ............................... 355/235 X Primary Examiner—R. L. Moses
Attorney, Agent, or Firm—Foley & Lardner, Schwartz, Jeffery, Schwaab, Mack, Blumenthal & Evans

[57] ABSTRACT

An optical scanning device for an image forming apparatus includes a document table on which an original document is placed, an image carrier, and a carriage for transmitting reflected light from the original document onto the image carrier. The optical scanning device further includes a pair of guide rails for supporting the carriage and for guiding movement of the carriage, a moving mechanism for moving the carriage in a prescribed direction along the guide rails, and a pair of holding rollers rotatably fixed to the carriage to closely sandwich the pair of guide rails.

4 Claims, 3 Drawing Sheets

OPTICAL SCANNING DEVICE FOR IMAGE FORMING APPARATUS

BACKGROUND OF THE INVENTION

1. Field of the Invention

The present invention relates to an optical scanning device for an image forming apparatus which scans an original document for forming a light image of the original document on an image carrier.

2. Description of the Related Art

A conventional optical scanning device for an image forming apparatus, such as a copying machine, is reciprocally moved by a driving mechanism to scan an original document. A light image is irradiated on an image carrier, for instance, a photoconductive drum, by the scanning of the original document with the optical scanning device.

In a first conventional optical scanning device, the device comprises a pair of shafts, a carriage on which a lamp, a reflector and a mirror are mounted, a pair of pipe-shaped supporting members mounted on the carriage, and a moving mechanism for moving the carriage. The pair of shafts is inserted into the pair of supporting members, and thus the pair of supporting members slidably moves along the shafts. The carriage is operatively connected to the moving mechanism to be reciprocally moved along the shafts via the pair of pipe-shaped supporting members.

In a second conventional optical scanning device, the device comprises a pair of guide rails, a carriage on which a lamp, a reflector and a mirror are mounted and having a pair of extended portions, a pair of slide members made of plastic with a low coefficient of friction mounted on the pair of extended portions, and a moving mechanism for moving the carriage. The carriage is movably placed on the pair of guide rails via the slide members. The carriage is operatively connected to the moving mechanism to be reciprocally moved along the rails via the pair of slide members.

However, the above-mentioned conventional optical scanning devices have many problems. That is, force moments occur about the leading edge in the moving direction of the carriages at the start of forward movement and at the start of backward movement during the scanning operation of the optical scanning devices. In the first conventional optical scanning device, although a certain amount of clearance is required between the shaft and the pipe-shaped supporting member, when a force moment occurs at the start of reciprocal movement, rattling occurs between the pair of shafts and the pipe-shaped supporting members due to this clearance. This leads to a problem of poor picture quality due to the occurrence of image blurring.

In the second conventional optical scanning device, since the carriage is held only on the guide rails by its own weight via the slide members, there is a problem in that the carriage is liable to jump up at the start of reciprocal movement or due to other external forces and thus image blurring will occur. In either case, the higher the copying speed, the greater the blurring, and thus there is a problem in that the system cannot be applied to high-speed models.

SUMMARY OF THE INVENTION

It is an object of the present invention to provide an optical scanning device for an image forming apparatus which can obtain high quality images without the occurrence of image blurring due to the vibration of the carriage during reciprocal movement.

According to the present invention, an optical scanning device for an image forming apparatus including a document table on which an original document is placed, an image carrier, and carriage means for transmitting reflected light from the original document onto the image carrier, the device comprises guide means for supporting the carriage means and for guiding movement of the carriage means: moving means for moving the carriage means in a prescribed direction along the guide means; and deterring means, associated with, and between the carriage means and the guide means, for deterring the occurrence of a force moment in the carriage means during the moving of the carriage means in the prescribed direction.

BRIEF DESCRIPTION OF THE DRAWINGS

FIGS. 1 to 5 show an optical scanning device for an image forming apparatus according to an embodiment of the present invention, in which:

FIG. 1 is a sectional view showing the optical scanning device assembled in the image forming apparatus;

FIG. 2 is a partial side view of a first carriage mounted on a guide rail;

FIG. 3 is a cross-sectional view taken along line III—III in FIG. 2;

FIG. 4 is a partial side view of a second carriage mounted on a guide rail; and

FIG. 5 is a cross-sectional view taken along line V—V in FIG. 4.

DETAILED DESCRIPTION OF THE PREFERRED EMBODIMENT

Figure 1:
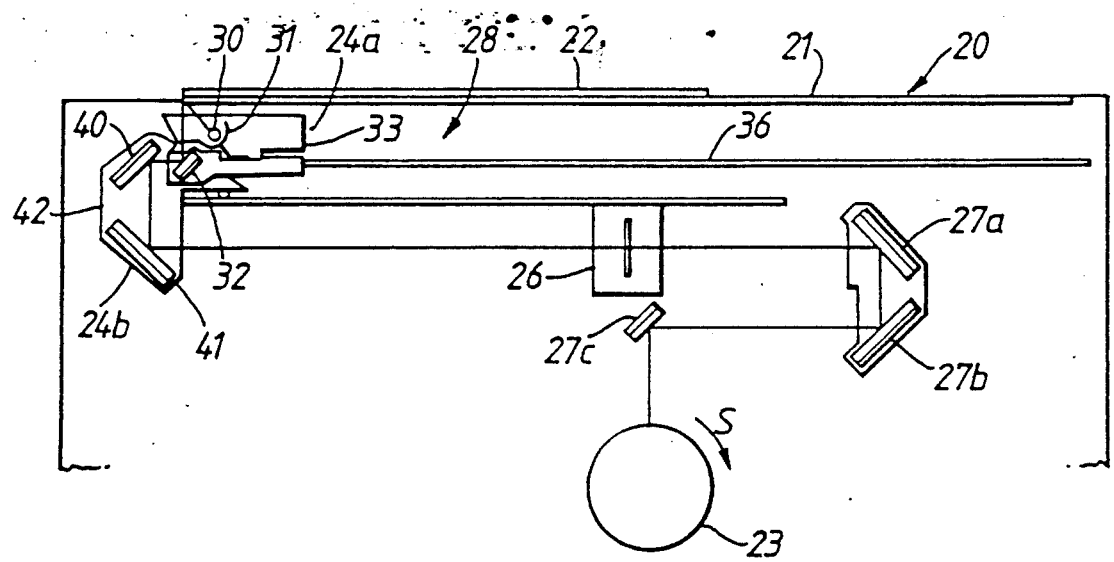
Figure 2:
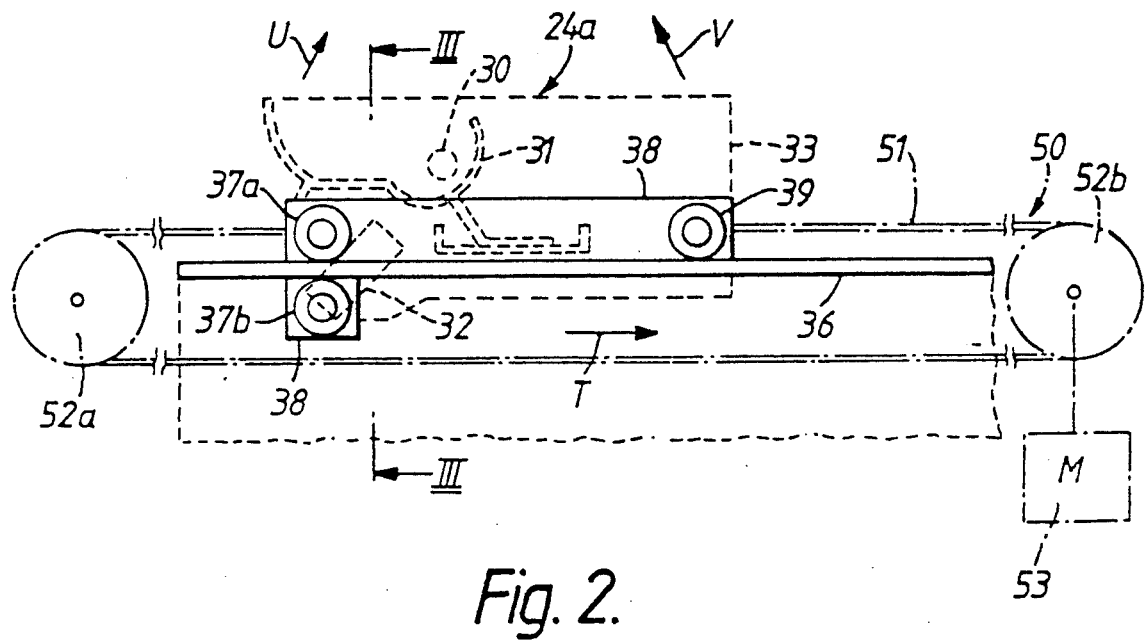
Figure 3:
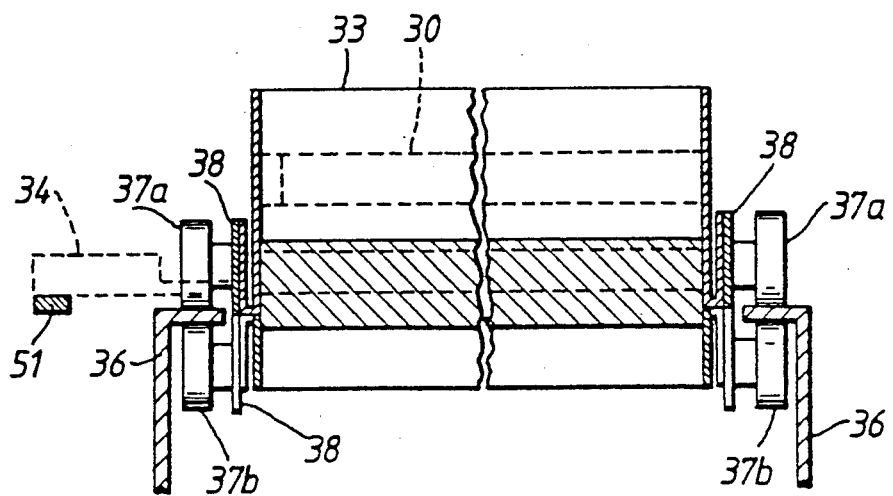
Figure 4:
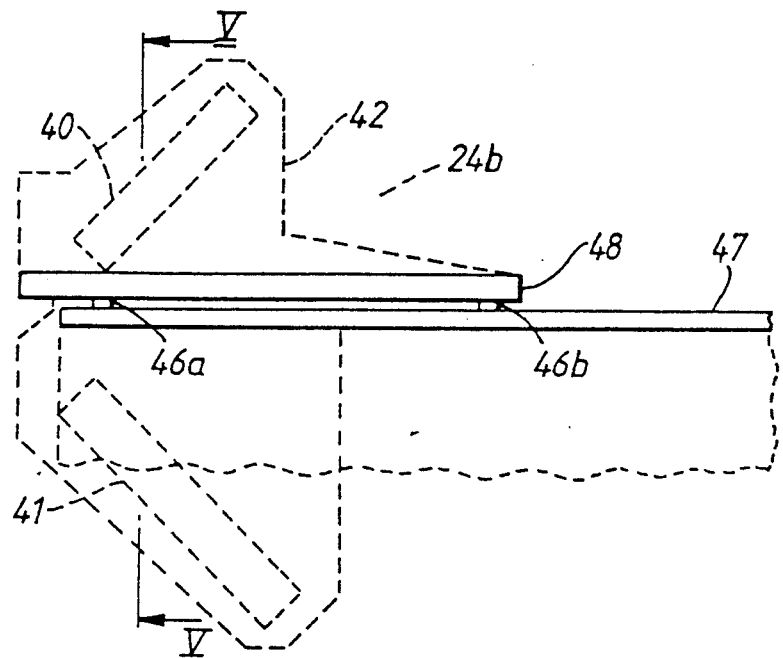
Figure 5:
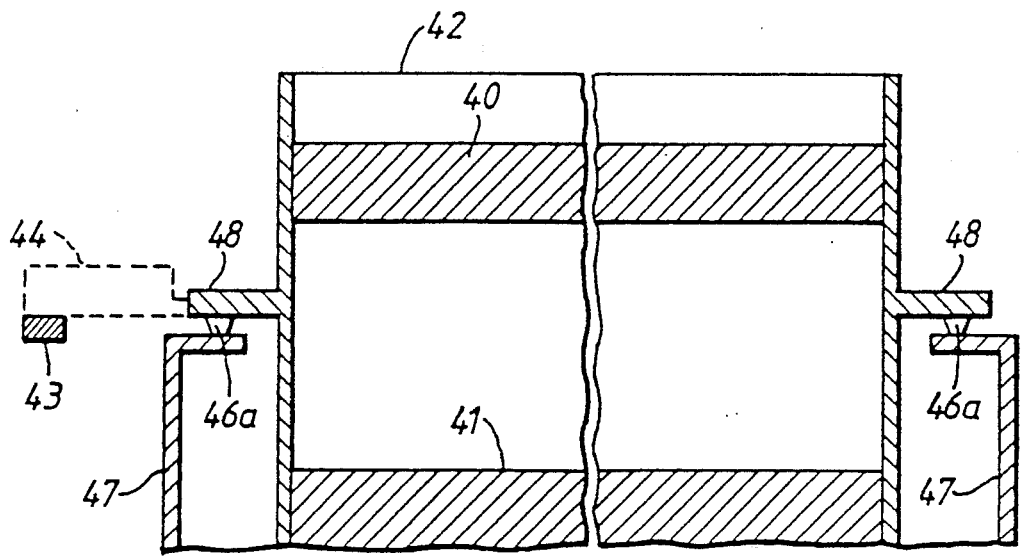

A preferred embodiment of the present invention will now be described with reference to FIGS. 1 to 5. On a main body 20 of a copying machine as an image forming apparatus, a document table 21 made of a glass is provided for receiving an original document 22. An optical scanning device 28, which forms an image of original document 22 onto a photosensitive body 23, is arranged between original document 22 on original document table 21 and photosensitive body 23. Optical scanning device 28 comprises a first scanning unit 24a, a second scanning unit 24b, a fixed lens unit 26, a fourth mirror 27a, a fifth mirror 27b and a sixth mirror 27c. First scanning unit 24a is constructed with an exposure lamp 30, a reflector 31 and a first mirror 32 which are the optical members and a first carriage 33 on which these are mounted. As shown in FIG. 2, first scanning unit 24a also includes a driving mechanism 50 comprising a pair of pullies 62a and 52b, an endless belt 51 wound around pullies 52a and 52b, and a reversible motor 53 connected to pulley 52b. As shown in FIG. 3, one end portion 34 formed on first carriage 33 is connected to endless belt 51 for reciprocally moving first carriage 33 via endless belt 51. A pair of first guide rails 36 support the opposite sides of first carriage 33 when first carriage 33 is reciprocally moved along first guide rails 36 during the scanning operation.

A pair of holding rollers 37a and 37b are rotatably fixed to extended members 38 formed at both sides of first carriage 33 at the rear end in the scanning direction. The pair of holding rollers 37a and 37b are arranged to closely sandwich guide rails 36 from above and below so as to support carriage 33, via roller 37a, and to deter or prevent carriage 33, via roller 37b, from rising above the surface of rail 36. A pair of support rollers 39, which are placed on first guide rails 36, are rotatably mounted on the opposite sides of first carriage 33 at the front end in the scanning direction.

Second scanning unit 24b is constructed with a second mirror 40 and a third mirror 41 which are the optical members, and a second carriage 42 on which these are mounted. Second scanning unit 24b also includes a driving endless belt 43 to which one end portion 44 formed on second carriage 42 is connected as a driving mechanism. Both sides of second carriage 42 are supported by supporting members 48 and are mounted on a pair of second guide rails 47 via a pair of slide members 46a and 46b made of plastic with a low coefficient of friction.

Next, the operation of the optical scanning device will be described. When a print button (not shown) is pressed to commence the copying operation, exposure lamp 30 is lit and photosensitive body 23 is rotated in a direction S. At the same time, first carriage 33 is moved forward in a direction T, which is the direction of scanning original document 22 via endless belt 51 driven by motor 53. When this forward movement commences, a moment in a direction U acts on the rear of carriage 33 in the original document scanning direction, as shown in FIG. 2. However, due to holding rollers 37a and 37b which closely sandwich first guide rails 36 in that position, first carriage 33 does not vibrate in the direction U and so there is no blurring of the exposed image which is formed on photosensitive body 23. After this, when the scanning of original document 22 by exposure lamp 30 is complete, carriage 33 is returned in the opposite direction of arrow T at a higher speed than when scanning, by endless belt 51. When this returning movement commences, a moment is generated in a direction V at the leading edge of carriage 33 in the scanning direction. Since the speed of first carriage 33 when moving backward is higher than that when moving forward, the moment in the direction V has a greater influence on first carriage 33 than the moving in the direction U. Since, in that position, first carriage 33 is only placed on first guide rails 36 via supporting roller 39, it absorbs the shock at the commencement of the backward moving by rotating freely in the direction of the force moment V. However, even if first carriage 33 vibrates due to the moment in the direction V, this causes no difficulty since the first scanning unit 24a, in which the exposure lamp 30 will be lifted by moment V, does not scan the original document 22 during the return movement.

During the above return movement, second carriage 42 is reciprocating with first carriage 33 at ½ the speed of movement of first carriage 33. Second carriage 42 has no holding members corresponding to holding rollers 37a and 37b first carriage 33. Also, its speed of movement is only ½ the speed of movement of first carriage 33 and, moreover, it mounts two mirrors, i.e. second mirror 40 and third mirror 41. Thus, its weight is heavy. As a result. second carriage 42 undergoes hardly any influence of the moment generated in it at the commencement of reciprocating movement and is not vibrated. In this way an electrostatic latent image is formed on photosensitive body 23 during the forward movement in the direction T of first carriage 33 and second carriage 42.

As described above, despite the moment which is generated at the commencement of forward movement to scan the original document 22, the first carriage 33 does not vibrate due to the pair of holding rollers 37a and 37b, which closely sandwich the first guide rails 36. Thus, even in high-speed models does not occur in the electrostatic latent image formed on photosensitive body 23, and good quality copy pictures can be obtained.

According to the present invention good pictures can be obtained without image blurring occurring due to vibration of the carriage when scanning the original document, even in high-speed models. Thus, it is possible to increase the speed of the scanning operation further and still obtain good pictures.

Numerous modifications and variations of the present invention are possible in light of the above teachings. It is therefore to be understood that, within the scope of the appended claims, the present invention can be practiced in a manner other than as specifically described herein.

what is claimed is:

1. An optical scanning device for an image forming apparatus including a document table on which an original document is placed, an image carrier, and carriage means moving in a first direction for transmitting reflected light from the original document onto the image carrier, and moving in a second direction, opposite to the first direction, and having a front portion and a rear end portion relative to the first direction, the device comprising:
   a pair of rails.
   a pair of first rollers rotatably fixed to the rear end portion of the carriage means to respectively roll on the upper surfaces of the pair of rails;
   moving means for moving the carriage means in the first direction and the second direction along the rails; and
   a pair of second rollers rotatably fixed to the rear end portion of the carriage means to respectively contact with the under surfaces of the pair of rails for deterring a force moment from occurring in the carriage means during movement of the carriage means in the first direction.

2. The device of claim 1 wherein the moving means includes a moving belt connected with the carriage means, and a motor operatively connected with the moving belt to drive the moving belt.

3. The device of claim 2 wherein the motor includes a reversible motor to reciprocally drive the moving belt.

4. An optical scanning device for an image forming apparatus including a document table on which an original document is placed, an image carrier, the device comprising:
   movable carriage means having front and rear end portions with respect to a first direction for transmitting light reflected from the original document onto the image carrier during movement in the first direction;
   a pair of rails each extending along the first direction, the rails each having a first surface and a second surface opposite to the first surface;
   a pair of first rollers rotatably fixed to the rear end portion of the carriage means to roll on the first surfaces of the pair of rails respectively;
   a pair of second rollers rotatably fixed to the front end portion of the carriage means to roll on the first surfaces of the pair of rails respectively;
   moving means for reciprocally moving the carriage means in the first direction and a second direction, opposite to the first direction, along the pair of rails; and a pair of third rollers rotatably fixed to the rear end portion of the carriage means to respectively contact with the second surfaces of the rails for preventing the rear end portion of the carriage means from moving in a third direction perpendicular to the first and second surfaces of the rails caused by a force moment occurring in the carriage means during movement of the carriage means in the first direction, and for allowing free movement of the front end portion of the carriage means in the third direction caused by the force moment occurring in the carriage means during movement of the carriage means in the second direction thereby permitting movement of the carriage means in the second direction faster than that in the first direction.

* * * * *